United States Patent [19]

Kraus

[11] Patent Number: 4,710,408

[45] Date of Patent: Dec. 1, 1987

[54] PRIMER COATING FOR CYCLOOLEFIN POLYMER ARTICLES

[75] Inventor: Wayne A. Kraus, Newark, Del.

[73] Assignee: Hercules Incorporated, Wilmington, Del.

[21] Appl. No.: 884,821

[22] Filed: Jul. 11, 1986

[51] Int. Cl.$^4$ .......................... B05D 3/02; C08L 61/02
[52] U.S. Cl. .............................. 427/393.5; 427/412.3; 524/379; 524/500; 524/539; 525/398; 525/418; 525/517.5
[58] Field of Search ........................ 427/393.5, 412.3; 524/500, 379, 539; 525/517.5, 398, 418

[56] References Cited

U.S. PATENT DOCUMENTS

| | | | |
|---|---|---|---|
| 3,639,147 | 2/1972 | Benefiel et al. | 427/393.5 X |
| 4,220,675 | 9/1980 | Imazaki | 427/27 |
| 4,391,858 | 7/1983 | Batzill | 427/407 |
| 4,400,340 | 8/1983 | Klosiewicz | 526/283 X |
| 4,456,647 | 6/1984 | Schönfelder et al. | 427/393.5 X |
| 4,529,632 | 7/1985 | Fujii et al. | 427/412.3 X |
| 4,532,177 | 7/1985 | Mahar | 428/328 |

FOREIGN PATENT DOCUMENTS

| | | |
|---|---|---|
| 137256 | 4/1985 | European Pat. Off. . |
| 2938308 | 1/1985 | Fed. Rep. of Germany . |
| 1042897 | 9/1966 | United Kingdom ............ 427/412.3 |

*Primary Examiner*—Thurman K. Page
*Attorney, Agent, or Firm*—Joanne W. Patterson

[57] ABSTRACT

Disclosed is a primer coating for cycloolefin polymer articles comprising an alkyd resin, a urea-formaldehyde resin, at least one 2-4 carbon alkanol, a nonleafing aluminum pigment and an acid catalyst. A cellulose ester and a solvent for the cellulose ester may also be included. The primer coating prevents migration of antioxidant from the cycloolefin polymer into a subsequently applied topcoat.

14 Claims, No Drawings

PRIMER COATING FOR CYCLOOLEFIN POLYMER ARTICLES

FIELD OF THE INVENTION

This invention relates to a primer coating composition for molded articles made from cycloolefin polymers. This invention especially relates to a crosslinkable, alcohol-based primer coating composition that is used to prevent staining of the topcoat that is subsequently applied to the molded article.

BACKGROUND OF THE INVENTION

Molded articles made from cycloolefin polymers such as thermoset poly(dicyclopentadiene), the preparation of which is described in U.S. Pat. No. 4,400,340, are typically painted with a topcoat such as a white acrylic-urethane enamel. It has been found that a brown stain, attributed to the antioxidant used in the polymer, migrates through the paint film. The antioxidant stain discolors the painted article and is objectionable for cosmetic reasons.

SUMMARY OF THE INVENTION

It has now been found that a crosslinkable primer coating composition having a solvent system that is a nonsolvent for cycloolefin polymers and containing a nonleafing aluminum pigment, will prevent staining of a topcoat subsequently applied to a cycloolefin polymer article.

The primer coating composition of this invention comprises (1) from about 8% to about 46% alkyd resin, (2) from about 3% to about 18% urea-formaldehyde resin, (3) from about 25% to about 83% of at least one 2-4 carbon alkanol, (4) from about 1.5% to about 24% nonleafing aluminum pigment, (5) from about 0.5% to about 3.5% acid catalyst, (6) from 0 to about 22% cellulose ester, and (7) from 0 to about 11% of a solvent for the cellulose ester, based on the total weight of the composition.

DETAILED DESCRIPTION OF THE INVENTION

The primer coating composition of this invention is applied to molded articles made from cycloolefin polymers. Typical of such cycloolefin polymers is thermoset poly(dicyclopentadiene). Without the primer, the preferred antioxidant typically used in cycloolefin polymers, N,N'-diphenyl-p-phenylenediamine, migrates into a subsequently applied topcoat and causes staining of the point film.

Three facotrs contribute to the success of the primer coating composition of this invention in preventing the migration of the antioxidant into a subsequently applied topcoat. The first factor is the use of at least one 2-4 C monohydric alkanol as the solvent system for the primer coating composition. Aromatic and aliphatic hydrocarbon solvents, esters and ketones soften cycloolefin polymers and would allow the antioxidant stain to migrate freely. The alkanol has no pronounced effect on cycloolefin polymers and thereby helps to eliminate stain formation. The preferred solvent system for the primer coating composition is a mixture of from about 21% to about 83% anhydrous ethanol and from about 4% to about 17% butanol.

The second factor is the use of a nonleafing aluminum pigment. Such pigment particles orient themselves within the primer coating film in an overlapping fashion and act as a barrier against stain migration.

The third factor is the use of a crosslinkable film-forming system for the primer coating composition. The cross-linked film acts as a further barrier against stain migration. One component of the film-former is an alkyd resin. Any alkyd resin that is soluble in the alkanol solvent and crosslinks rapidly in the presence of an acid catalyst can be used. The alkyd resin is present in an amount of from about 8% to about 46%, based on the total weight of the primer composition. The second component of the film-former is a urea-formaldehyde resin. Any urea-formaldehyde resin that is soluble in the alkanol solvent and crosslinks rapidly in the presence of an acid catalyst can be used. The urea-formaldehyde resin is present in an amount of from about 3% to about 18%, based on the total weight of the primer composition. The film-former may also comprise a cellulose ester such as nitrocellulose or cellulose acetate butyrate to increase the drying rate of the primer composition. Any cellulose ester that is soluble in a combination of the alkanol and a solvent for the cellulose ester can be used. Nitrocellulose having an average nitrogen content of about 11% is preferred. When the cellulose ester is used it is present in an amount of from about 2% to about 22%, based on the total weight of the composition. When a cellulose ester is present in the composition, the composition also includes from about 2.5% to about 11%, based on the total weight of the composition of a solvent for the cellulose ester, e.g., ethyl acetate. Other esters, and ketones such as methyl ethyl ketone can also be used as the solvent for the cellulose ester.

The primer coating composition also comprises an acid catalyst that is capable of initiating crosslinking between the alkyd resin and the urea-formaldehyde resin at ambient temperature. Suitable catalysts included, but are not limited to, methanesulfonic acid, phenyl acid phosphate and para-toluenesulfonic acid. Para-toluenesulfonic acid is preferred. The acid catalyst is present in an amount of from about 0.5% to about 3.5%, based on the total weight of the primer coating.

The primer coating composition can be applied to the cycloolefin polymer article by any method commonly used in the art including brushing, dipping and spraying. Spraying is preferred for cosmetic reasons. The primer coating will crosslink overnight at ambient temperature, or it can be air dried for a short period of time, e.g., 15 minutes, and then baked at a temperature not exceeding 75° C. In this specification all parts and percentages are by weight unless otherwise noted. The following examples are illustrative of this invention and are not intended to limit its scope in any way.

EXAMPLE 1

A primer coating composition designated as Primer A having the following composition is prepared:

|  | Parts by Weight |
|---|---|
| Nitrocellulose[1] | 8.66 |
| Alkyd resin[2] | 24.63 |
| Urea-formaldehyde resin[3] | 6.94 |
| Anhydrous ethanol | 41.54 |
| Butanol | 8.49 |
| Ethyl acetate | 5.48 |
| Nonleafing aluminum paste[4] | 2.90 |
| 30% Para-toluenesulfonic acid in isopropanol | 1.36 |

|  | Parts by Weight |
| --- | --- |
|  | 100.0 |

Another suitable primer coating composition designated as Primer B having the following composition is prepared:

|  | Parts by Weight |
| --- | --- |
| Alkyd resin[2] | 45.14 |
| Urea-formaldehyde resin[3] | 13.58 |
| Anhydrous ethanol | 32.06 |
| Butanol | 4.25 |
| Nonleafing aluminum paste[4] | 4.15 |
| 30% Para-toluenesulfonic acid in isopropanol | .82 |
|  | 100.0 |

[1]SS Grade ½ sec, isopropyl alcohol-wet, manufactured by Hercules Inc.
[2]K-1600-70A polyester resin manufactured by McCloskey Corp.
[3]Beetle 60, a fast cure methylated urea-formaldehyde resin manufactured by American Cyanamide Co.
[4]Lansford-243 nonleafing aluminum paste manufactured by Silberline Mfg. Co.

Ten panels molded from poly(dicyclopentadiene) containing N,N'-diphenyl-p-phenylenediamine antioxidant are prepared for test purposes. Four panels are coated with primer A and topcoated with IMRON acrylic-urethane white enamel manufactured by DuPont. Four panels are coated with primer B and topcoated with IMRON. Two panels are coated with IMRON only. The finishing schedule for the primer coating and enamel topcoat is as follows:

1. Spray apply a primer coating that is 4-5 mils thick when wet.
2. Air dry 15 minutes.
3. Bake 20 minutes at 71° C.
4. Spray apply a coating of IMRON that is 4-5 mils thick when wet.
5. Air dry 15 minutes.
6. Bake 20 minutes at 71° C.

The stain resistance of the painted panels is determined in the following manner. Tristimulis values of L and b are recorded with a Hunter Lab Colorimeter. The L number is a measurement of whiteness and the b value is a measure of yellowing. Lower values of b are more desirable than higher values, and minus values are more desirable than plus values. The highest values of L are the most desirable. The panels are then baked at 105° C and L and b values are recorded after 7 days and 18 days. The readings are given in the table below.

| Sample No. | Original | | After 7 days at 105° C. | | After 18 days at 105° C. | |
| --- | --- | --- | --- | --- | --- | --- |
|  | L | b | L | b | L | b |
| 1 Primer A/IMRON | 94.0 | +0.1 | 92.2 | +0.3 | 91.6 | +1.4 |
| 2 Primer A/IMRON | 92.6 | +0.2 | 90.4 | +0.5 | 90.8 | +1.3 |
| 3 Primer A/IMRON | 92.1 | −0.1 | 91.2 | 0 | 90.9 | +1.0 |
| 4 Primer A/IMRON | 91.9 | −0.1 | 90.9 | +0.3 | 91.5 | +1.0 |
| 5 Primer B/IMRON | 91.4 | +0.1 | 90.4 | +0.4 | 90.2 | +2.2 |
| 6 Primer B/IMRON | 93.6 | +0.2 | 92.2 | +0.5 | 91.0 | +2.2 |
| 7 Primer B/IMRON | 91.2 | +0.1 | 90.5 | +0.7 | 90.9 | +2.2 |
| 8 Primer B/IMRON | 92.7 | +0.1 | 91.7 | +0.5 | 90.0 | +1.9 |
| 9 IMRON topcoat only | 93.3 | +0.3 | 88.9 | +3.6 | 89.3 | +3.8 |
| 10 IMRON topcoat only | 93.7 | +0.4 | 89.0 | +3.3 | 88.9 | +3.6 |

What I claim and desire to protect by Letters Patent is:

1. A primer coating composition for cycloolefin polymer articles comprising
   (a) from about 8% to about 46% alkyd resin,
   (b) from about 3% to about 18% urea-formaldehyde resin,
   (c) from about 25% to about 83% of at least one 2-4 carbon alkanol,
   (d) from about 1.5% to about 24% of nonleafing aluminum pigment, and
   (e) from about 0.5% to about 3.5% of an acid catalyst.
2. The composition of claim 1 wherein the cellulose ester is nitrocellulose.
3. The composition of claim 1 wherein the alkanol is a mixture of ethanol and butanol.
4. The composition of claim 1 wherein the catalyst is para-toluenesulfonic acid.
5. The composition of claim 1 wherein the cycloolefin polymer is poly(dicyclopentadiene).
6. A process for preventing staining of painted cycloolefin polymer articles comprising applying a primer coating composition to the articles, said composition comprising
   (a) from about 8% to about 46% alkyd resin,
   (b) from about 3% to about 18% urea-formaldehyde resin,
   (c) from about 25% to about 83% of at least on 2-4 carbon alkanol,
   (d) from about 1.5% to about 24% nonleafing aluminum pigment, and
   (e) from about 0.5% to about 3.5% of an acid catalyst, and then causing the composition to cross-link before painting.
7. The process of claim 13 wherein the cellulose ester is nitrocellulose.
8. The process of claim 6 wherein the alkanol is a mixture of ethanol and butanol.
9. The process of claim 6 wherein the catalyst is para-toluenesulfonic acid.
10. The process of claim 6 wherein the cycloolefin polymer is poly(dicyclopentadiene).
11. The composition of claim 1 which additionally comprises from about 2% to about 22% of a cellulose ester and from about 2.5% to about 11% of a solvent for the cellulose ester, based on the total weight of the composition.
12. The composition of claim 11 wherein the cycloolefin polymer is poly(dicyclopentadiene).
13. The process of claim 6 wherein the composition additionally comprises from about 2% to about 22% of a cellulose ester and from about 2.5% to about 11% of a solvent for the cellulose ester, based on the total weight of the composition.
14. The process of claim 13 wherein the cycloolefin polymer is poly(dicyclopentadiene).

* * * * *